US010021340B2

(12) United States Patent
Drazic et al.

(10) Patent No.: US 10,021,340 B2
(45) Date of Patent: Jul. 10, 2018

(54) METHOD AND AN APPARATUS FOR GENERATING DATA REPRESENTATIVE OF A LIGHT FIELD

(71) Applicant: THOMSON LICENSING, Issy les Moulineaux (FR)

(72) Inventors: Valter Drazic, Betton (FR); Laurent Blonde, Thorigné-Fouillard (FR); Arno Schubert, Chevaigne (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 15/268,480

(22) Filed: Sep. 16, 2016

(65) Prior Publication Data

US 2017/0085832 A1    Mar. 23, 2017

(30) Foreign Application Priority Data

Sep. 17, 2015  (EP) .................................. 15306446

(51) Int. Cl.
*H04N 5/378*    (2011.01)
*H04N 5/92*    (2006.01)
(Continued)

(52) U.S. Cl.
CPC ............. *H04N 5/9201* (2013.01); *G02B 7/34* (2013.01); *G02B 27/0075* (2013.01);
(Continued)

(58) Field of Classification Search
CPC .... H04N 5/9201; H04N 5/2254; H04N 5/378; H04N 9/04; G06T 1/0007; G06T 5/50;
(Continued)

(56) References Cited

U.S. PATENT DOCUMENTS 6,097,394 A    8/2000    Levoy et al.
6,342,917 B1    1/2002    Amenta
(Continued)

FOREIGN PATENT DOCUMENTS

EP    2239706    10/2010
EP    2806396    11/2014

OTHER PUBLICATIONS

Georgiev et al., "The radon image as plenoptic function", 2014 IEEE International Conference on Image Processing (ICIP), Paris, France, Oct. 27, 2014, pp. 1922-1926.
(Continued)

*Primary Examiner* — Twyler Haskins
*Assistant Examiner* — Angel L Garces-Rivera
(74) *Attorney, Agent, or Firm* — Brian J. Dorini, Esq.; Robert D. Shedd, Esq.

(57) ABSTRACT

There are several types of plenoptic devices and camera arrays available on the market, and all these light field acquisition devices have their proprietary file format. However, there is no standard supporting the acquisition and transmission of multi-dimensional information. It is interesting to obtain information related to a correspondence between pixels of a sensor of said optical acquisition system and an object space of said optical acquisition system. Indeed, knowing which portion of the object space of an optical acquisition system a pixel belonging to the sensor of said optical acquisition system is sensing enables the improvement of signal processing operations. The notion of pixel beam, which represents a volume occupied by a set of rays of light in an object space of an optical system of a camera along with a compact format for storing such information is thus introduce.

13 Claims, 13 Drawing Sheets

(51) Int. Cl.
*G02B 7/34* (2006.01)
*G02B 27/00* (2006.01)
*G06T 5/50* (2006.01)
*H04N 5/225* (2006.01)
*G06T 1/00* (2006.01)
*H04N 9/04* (2006.01)

(52) U.S. Cl.
CPC .............. *G06T 1/0007* (2013.01); *G06T 5/50* (2013.01); *H04N 5/2254* (2013.01); *H04N 5/378* (2013.01); *G06T 2200/21* (2013.01); *G06T 2207/10052* (2013.01); *G06T 2207/20061* (2013.01); *H04N 9/04* (2013.01)

(58) Field of Classification Search
CPC ....... G06T 2200/21; G06T 2207/20061; G06T 2207/10052; G02B 27/0075; G02B 7/34
See application file for complete search history.

(56) References Cited

U.S. PATENT DOCUMENTS

2014/0328535 A1* 11/2014 Sorkine-Hornung ..... G06T 5/00
                                                              382/154
2015/0177062 A1    6/2015 Nishiyama

OTHER PUBLICATIONS

Georgiev et al., "Lytro camera technology: theory, algorithms, performance analysis", Proceedings of SPIE, vol. 8667, Feb. 26, 2013, pp. 1-10.
Lin etal.—"On the number of samples needed in light field rendering with constant-depth assumptio"—Feb. 2000.
Linden—"Image Flow in Light Fields"—Aug. 1999—Computer Science Technical Reports 168 (1999).
Levin etal.,"Understanding camera trade-offs through a Bayesian analysis of light field projections"—Computer Vision—ECCV 2008—vol. 5305 of the series Lecture Notes in Computer Science—Proceedings of the 10th European Conference on Computer Vision: Part IV—pp. 88-101—Oct. 12-18, 2008.
Park etal., "Light ray field capture using focal plane sweeping and its optical reconstruction using 3D displays"—Optics Express, vol. 22, No. 21, pp. 25444-25454 , Oct. 2014.
Ng, "Digital Light Field Photography", Doctoral dissertation submitted to the Department of Computer Science and the Committee on graduate studies of Stanford University, Jul. 2006.
Wanner etal., "Generating EPI Representation of a 4D Light Fields with a Single Lens Focused Plenoptic Camera",—Advances in Visual Computing—7th International Symposium, ISVC 2011—vol. 6938 of the series Lecture Notes in Computer Science—pp. 90-101—Sep. 26-28, 2011.
http://www.cs.helsinki.fi/group/goa/mallinnus/lines/bresenh.html.

* cited by examiner

METHOD AND AN APPARATUS FOR GENERATING DATA REPRESENTATIVE OF A LIGHT FIELD

REFERENCE TO RELATED EUROPEAN APPLICATION

This application claims priority from European Application No. 15306446.4, entitled "A Method and an Apparatus for Generating Data Representative of a Light Field," filed on Sep. 17, 2015, the contents of which are hereby incorporated by reference in its entirety.

TECHNICAL FIELD

The present invention relates to generation of data representing a light field.

BACKGROUND

The acquisition of four-dimensional or 4D light-field data, which can be viewed as a sampling of a 4D light field, i.e. the recording of light rays, is explained in the article "*Understanding camera trade-offs through a Bayesian analysis of light field projections*" by Anat Levin and al., published in the conference proceedings of ECCV 2008 is an hectic research subject.

Compared to classical two-dimensional or 2D images obtained from a camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image. In order to acquire 4D light-field data, several techniques can be used. For example, a plenoptic camera is able to acquire 4D light-field data. Details of the architecture of a plenoptic camera are provided in FIG. 1A. FIG. 1A is a diagram schematically representing a plenoptic camera 100. The plenoptic camera 100 comprises a main lens 101, a micro-lens array 102 comprising a plurality of micro-lenses 103 arranged in a two-dimensional array and an image sensor 104.

Another way to acquire 4D light-field data is to use a camera array as depicted in FIG. 1B. FIG. 1B represents a multi-array camera 110. The multi-array camera 110 comprises a lens array 112 and an image sensor 114.

In the example of the plenoptic camera 100 as shown in FIG. 1A, the main lens 101 receives light from an object (not shown on the figure) in an object field of the main lens 101 and passes the light through an image field of the main lens 101.

At last, another way of acquiring a 4D light field is to use a conventional camera that is configured to capture a sequence of 2D images of a same scene at different focal planes. For example, the technique described in the document "*Light ray field capture using focal plane sweeping and its optical reconstruction using 3D displays*" by J.-H. Park et al., published in OPTICS EXPRESS, Vol. 22, No. 21, in October 2014, may be used to achieve the acquisition of 4D light field data by means of a conventional camera.

There are several ways to represent 4D light-field data. Indeed, in the Chapter 3.3 of the Ph.D dissertation thesis entitled "*Digital Light Field Photography*" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "*Generating EPI Representation of a 4D Light Fields with a Single Lens Focused Plenoptic Camera*", by S. Wanner and al., published in the conference proceedings of ISVC 2011.

Light-field data can take up large amounts of storage space which can make storage cumbersome and processing less efficient. In addition light-field acquisition devices are extremely heterogeneous. Light-field cameras are of different types for example plenoptic or camera arrays. Within each type there are many differences such as different optical arrangements, or micro-lenses of different focal lengths. Each camera has its own proprietary file format. At present here is no standard supporting the acquisition and transmission of multi-dimensional information for an exhaustive over-view of the different parameters upon which a light-field depends. As such acquired light-field data for different cameras have a diversity of formats. The present invention has been devised with the foregoing in mind.

SUMMARY OF INVENTION

According to a first aspect of the invention there is provided a computer implemented method for generating data representative of a volume in an object space of an optical acquisition system occupied by a set of rays of light that at least one pixel of a sensor of said optical acquisition system can sense through a pupil of said optical acquisition system, said volume being called a pixel beam, comprising:

obtaining (S803), from light field data captured by the optical acquisition device, intersection data defining intersections of a light field ray representative of the pixel beam with a plurality of given reference planes, said reference planes corresponding to different depths in the object space;

obtaining ray diagram parameters (S805, S806) defining the graphical representation of the intersection data in a 4D ray diagram, and associating said ray diagram parameters with parameters defining the pixel beam to provide data representative of the pixel beam.

According to an embodiment of the invention, the light field ray representative of the pixel beam is a straight line passing through the centre of the pixel and the centre of the pupil and the parameters defining the pixel beam are a position and a size of a conjugate of the pixel in the object space.

According to an embodiment of the invention, the interception data corresponding to the light field ray is graphically represented in the ray diagram as datalines and the ray diagram parameters include data representative of at least one of:

the slope of a dataline; and
an interception of a dataline with an axis of the ray diagram.

According to an embodiment of the invention, the datalines are detected in the 2D ray diagram by applying a Radon transform.

According to an embodiment of the invention, the graphical representation is provided as an matrix of cells to provide a digital datalinet, each digital dataline format being defined by a plurality of cells, at least one first cell representative of the interception of the line with an axis and at least one second cell from which the slope of the line may be determined.

According to an embodiment of the invention, each digital dataline is generated by application of Bresenham's algorithm.

According to an embodiment of the invention, the data representative of the pixel beam further comprises colour data representing the colour of the corresponding light field ray.

According to an embodiment of the invention, the data representative of the pixel beam is provided as meta data, the header of meta data comprising the ray diagram parameters defining the graphical representation of the intersection data in a 2D ray diagram and the body of the metadata comprising data representative of colour of the ray and the parameters defining a position and a size of a conjugate of the pixel in the object space.

Another object of the invention is device for providing metadata for a volume in an object space of an optical acquisition system occupied by a set of rays of light that at least one pixel of a sensor of said optical acquisition system can sense through a pupil of said optical acquisition system, said volume being called a pixel beam, the device comprising a light field data acquisition module for acquiring light field data captured by a light field camera and a light field data generation module configured to:
  obtain, from the acquired light field data, intersection data defining intersections of the light field ray representative of the pixel beam with a plurality of given reference planes, said reference planes being parallel to one another and corresponding to different depths in the object space; and
  obtain ray diagram parameters defining the graphical representation of the intersection data in a 2D ray diagram to provide data representative of the acquired light field data;
  associate said ray diagram parameters with parameters defining the pixel beam to provide data representative of the pixel beam.

Another object of the invention concerns a light field imaging device comprising:
  an array of micro lenses arranged in a regular lattice structure;
  a photosensor configured to capture light projected on the photosensor from the array of micro lenses, the photosensor comprising sets of pixels, each set of pixels being optically associated with a respective micro lens of the array of micro lenses; and
  a device for providing metadata in accordance with claim 9.

Another object of the invention concerns a device for rendering an image from light field data using obtained in accordance with the method of any one of claims 1 to 8.

According to another aspect of the invention there is provided a data package for data representative of a volume in an object space of an optical acquisition system occupied by a set of rays of light that at least one pixel of a sensor of said optical acquisition system can sense through a pupil of said optical acquisition system, said volume being called a pixel beam, comprising a ray diagram parameters defining the graphical representation in a 2D ray diagram of intersection data of the light ray representative of the pixel beam, the intersection data defining intersections of the light field ray representative of the pixel beam with a plurality of given reference planes, said reference planes being parallel to one another and corresponding to different depths in the object space; colour data defining colours of the light field ray representative of the pixel beam and parameters defining a position and a size of a conjugate of the pixel in the object space.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium(a) may be utilized.

Embodiments of the invention provide formatting of light-field data for further processing applications such as format conversion, refocusing, viewpoint change and 3D image generation.

Figure 1A:
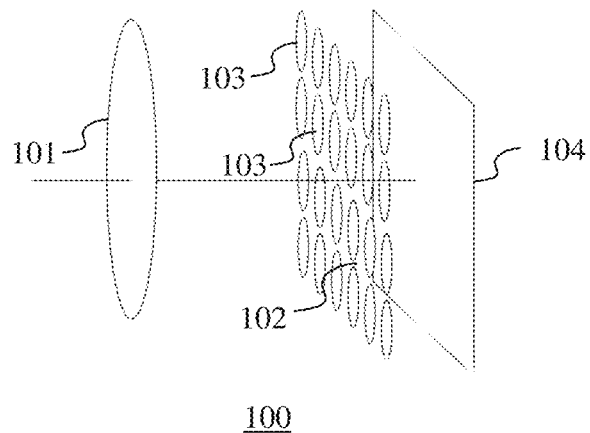
FIG. 1A is a diagram schematically representing a plenoptic camera.
Figure 1B:
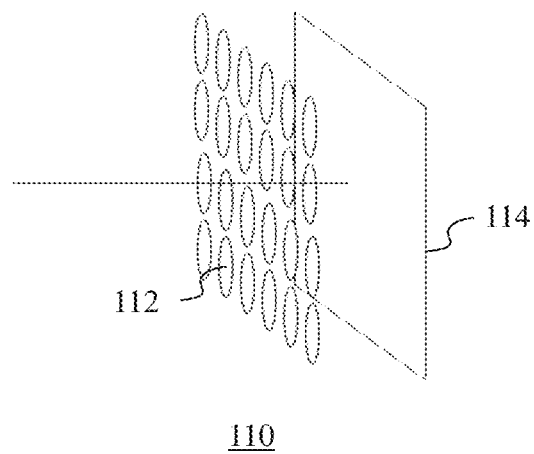
FIG. 1B represents a multi-array camera.
Figure 2A:
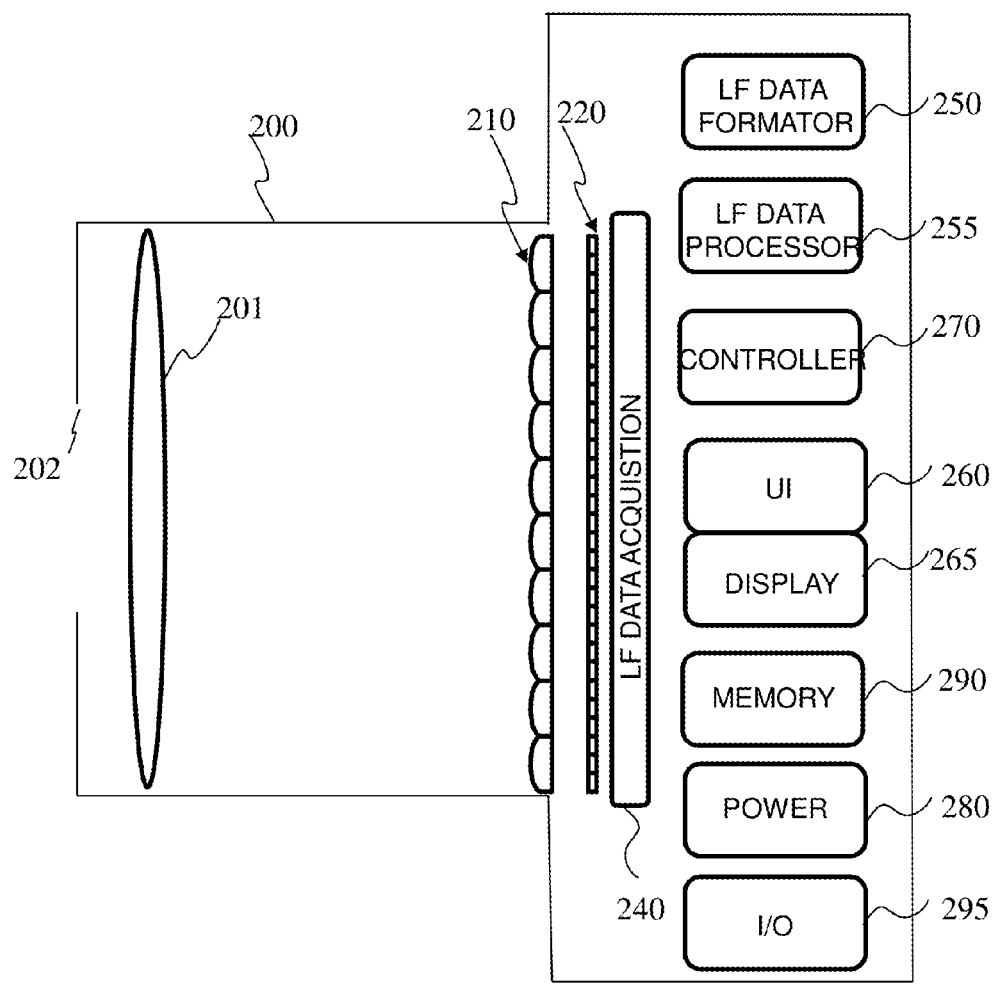
FIG. 2A is a functional diagram of a light-field camera according to an embodiment of the invention.

FIG. 2A is a block diagram of a light-field camera device in accordance with an embodiment of the invention. The light-field camera comprises an aperture/shutter 202, a main (objective) lens 201, a micro lens array 210 and a photosensor array 220 in accordance with the light-field camera of FIG. 1A. In some embodiments the light-field camera includes a shutter release that is activated to capture a light-field image of a subject or scene. It will be appreciated that the functional features may also be applied to the light-field camera of FIG. 1B.

The photosensor array 220 provides light-field image data which is acquired by LF Data acquisition module 240 for generation of a light-field data format by light-field data formatting module 250 and/or for processing by light-field data processor 255. Light-field data may be stored, after acquisition and after processing, in memory 290 in a raw data format, as sub aperture images or focal stacks, or in a light-field data format in accordance with embodiments of the invention.

In the illustrated example, the light-field data formatting module 150 and the light-field data processor 255 are disposed in or integrated into the light-field camera 200. In other embodiments of the invention the light-field data formatting module 250 and/or the light-field data processor 255 may be provided in a separate component external to the light-field capture camera. The separate component may be local or remote with respect to the light-field image capture device. It will be appreciated that any suitable wired or wireless protocol may be used for transmitting light-field image data to the formatting module 250 or light-field data processor 255; for example the light-field data processor may transfer captured light-field image data and/or other data via the Internet, a cellular data network, a WiFi network, a BlueTooth communication protocol, and/or any other suitable means.

The light-field data formatting module 250 is configured to generate data representative of the acquired light-field, in accordance with embodiments of the invention. The light-field data formatting module 250 may be implemented in software, hardware or a combination thereof.

The light-field data processor 255 is configured to operate on raw light-field image data received directly from the LF data acquisition module 240 for example to generate focal stacks or a matrix of views in accordance with embodiments of the invention. Output data, such as, for example, still images, 2D video streams, and the like of the captured scene may be generated. The light-field data processor may be implemented in software, hardware or a combination thereof.

In at least one embodiment, the light-field camera 200 may also include a user interface 260 for enabling a user to provide user input to control operation of camera 100 by controller 270. Control of the camera may include one or more of control of optical parameters of the camera such as shutter speed, or in the case of an adjustable light-field camera, control of the relative distance between the microlens array and the photosensor, or the relative distance between the objective lens and the microlens array. In some embodiments the relative distances between optical elements of the light-field camera may be manually adjusted. Control of the camera may also include control of other light-field data acquisition parameters, light-field data formatting parameters or light-field processing parameters of the camera. The user interface 260 may comprise any suitable user input device(s) such as a touchscreen, buttons, keyboard, pointing device, and/or the like. In this way, input received by the user interface can be used to control and/or configure the LF data formatting module 250 for controlling the data formatting, the LF data processor 255 for controlling the processing of the acquired light-field data and controller 270 for controlling the light-field camera 200.

The light-field camera includes a power source 280, such as one or more replaceable or rechargeable batteries. The light-field camera comprises memory 290 for storing captured light-field data and/or rendered final images or other data such as software for implementing methods of embodiments of the invention. The memory can include external and/or internal memory. In at least one embodiment, the memory can be provided at a separate device and/or location from camera 200. In one embodiment, the memory includes a removable/swappable storage device such as a memory stick.

The light-field camera may also include a display unit 265 (e.g., an LCD screen) for viewing scenes in front of the camera prior to capture and/or for viewing previously captured and/or rendered images. The screen 265 may also be used to display one or more menus or other information to the user. The light-field camera may further include one or more I/O interfaces 295, such as FireWire or Universal Serial Bus (USB) interfaces, or wired or wireless communication interfaces for data communication via the Internet, a cellular data network, a WiFi network, a BlueTooth communication protocol, and/or any other suitable means. The I/O interface 295 may be used for transferring data, such as light-field representative data generated by LF data formatting module in accordance with embodiments of the invention and light-field data such as raw light-field data or data processed by LF data processor 255, to and from external devices such as computer systems or display units, for rendering applications.

Figure 2B:
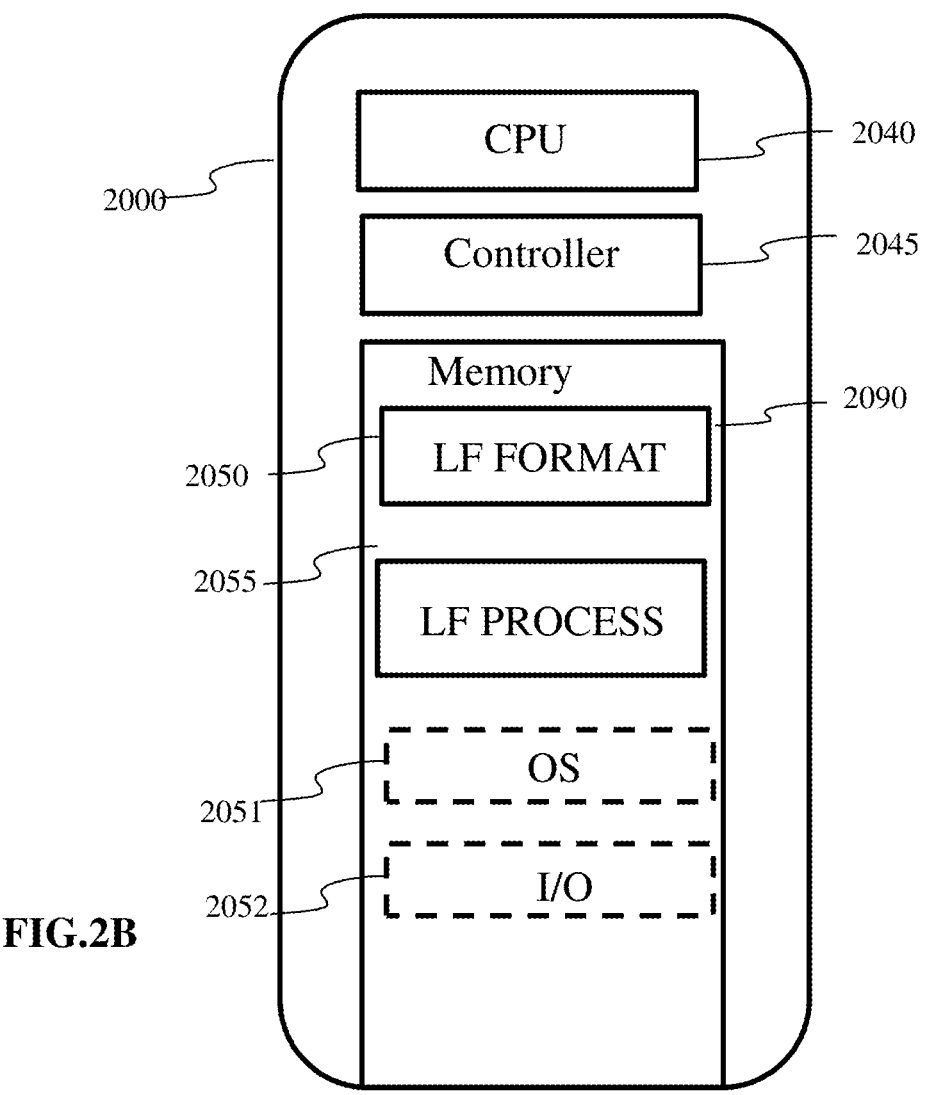
FIG. 2B is a functional diagram of a light-field data formator and light-field data processor according to an embodiment of the invention.

FIG. 2B is a block diagram illustrating a particular embodiment of a potential implementation of light-field data formatting module 250 and the light-field data processor 253.

The circuit 2000 includes memory 2090, a memory controller 2045 and processing circuitry 2040 comprising one or more processing units (CPU(s)). The one or more processing units 2040 are configured to run various software programs and/or sets of instructions stored in the memory 2090 to perform various functions including light-field data formatting and light-field data processing. Software components stored in the memory include a data formatting module (or set of instructions) 2050 for generating data representative of acquired light data in accordance with embodiments of the invention and a light-field data processing module (or set of instructions) 2055 for processing light-field data in accordance with embodiments of the invention. Other modules may be included in the memory for applications of the light-field camera device such as an operating system module 2051 for controlling general system tasks (e.g. power management, memory management) and for facilitating communication between the various hardware and software components of the device 2000, and an interface module 2052 for controlling and managing communication with other devices via I/O interface ports.

Figure 3:
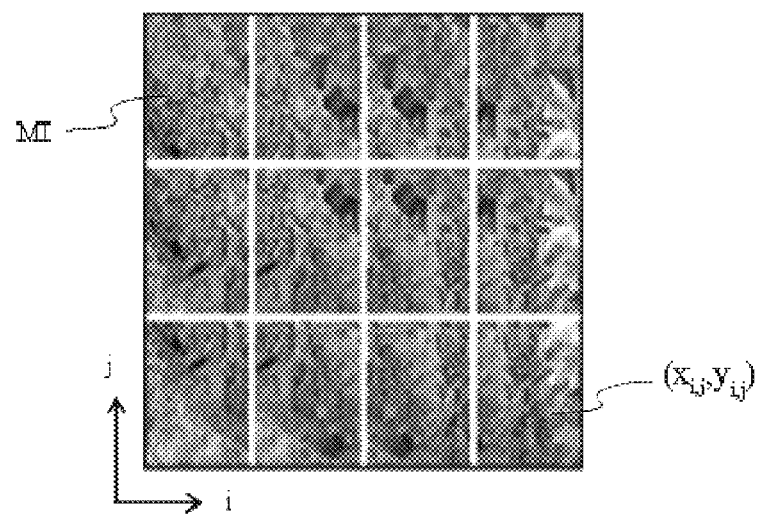
FIG. 3 is an example of a 2D light-field image formed on a photosensor array.

FIG. 3 illustrates an example of a 2D image formed on the photosensor array 104 of FIG. 1A or the photosensor array 114 of FIG. 1B. The 2D image, often referred to as a raw 4D light-field image, is composed of an array of micro images MI, each micro image being produced by the respective micro lens (i, j) of the microlens array 102,112. The micro images are arranged in the array in a rectangular lattice structure defined by axes i and j. A micro lens image may be referenced by the respective micro lens coordinates (i, j). A pixel PI of the photosensor 104, 114 may be referenced by its spatial coordinates (x, y). 4D light-field data associated with a given pixel may be referenced as (x, y, i, j).

There are several ways of representing (or defining) a 4D light-field image. For example, a 4D light-field image can be represented, by a collection of micro-lens images as previously described with reference to FIG. 3. A 4D light-field image may also be represented, when recorded by a plenoptic camera by a set of sub-aperture images. Each sub-aperture image of composed of pixels of the same position selected from each microlens image. Furthermore, a 4D light-field image may be represented by a set of epipolar images, which is not the case of the pixel beam.

Embodiments of the invention provide a representation of light-field data based on the notion of pixel beam. In this way the diversity in formats and light-field devices may be taken into account. Indeed, one drawback of ray based formats, is that the parametrization planes have to be sampled to reflect the pixel formats and sizes. Therefore, the sampling needs to be defined along other data in order to recover physical meaningful information.

Figure 4:
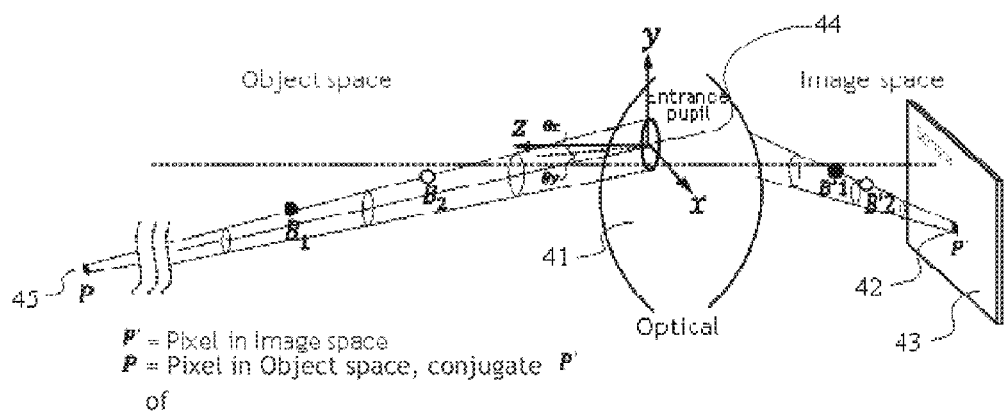
FIG. 4 represents a volume occupied by a set of rays of light in an object space of an optical system of a camera or optical acquisition system.

A pixel beam 40, as shown on FIG. 4, represents a volume occupied by a set of rays of light in an object space of an optical system 41 of a camera. The set of rays of light is sensed by a pixel 42 of a sensor 43 of the camera through a pupil 44 of said optical system 41 Contrary to rays, pixel beams 40 may be sample at will since they convey per se the "étendue" which corresponds to the preservation of the energy across sections of the physical light rays.

A pupil of an optical system is defined as the image of an aperture stop as seen through said optical system, i.e. the lenses of the camera, which precedes said aperture stop. An aperture stop is an opening which limits the amount of light which passes through the optical system of the camera. For example, an adjustable diaphragm located near the front of a camera lens is the aperture stop for the lens. The amount of light admitted through the diaphragm is controlled by the diameter of the diaphragm opening which may adapted depending of the amount of light a user of the camera wishes to admit. For example, making the aperture smaller reduces the amount of light admitted through the diaphragm, but increases the depth of focus. The effective size of a stop may be larger or smaller than its physical size because of the refractive action of a lens. Formally, a pupil is the image of the aperture stop through a part of the optical system of the camera.

A pixel beam 40 is defined as a pencil of rays of light that reach a given pixel 42 when propagating through the optical system 41 via an entrance pupil 44. As light travel on straight lines in free space, the shape of such a pixel beam 40 can be defined by two sections, one being the conjugate 45 of the pixel 42, and the other being the entrance pupil 44. The pixel 42 is defined by its non-null surface and its sensitivity map.

Figure 5:
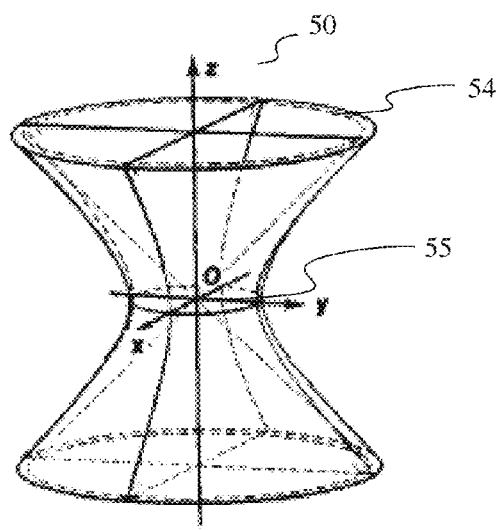
FIG. 5 represents a hyperboloid of one sheet.

Thus, a pixel beam may be represented by an hyperboloid of one sheet 50, as shown on FIG. 5, supported by two elements: the pupil 54 and the conjugate 55 of the pixel 42 in the object space of the camera.

A hyperboloid of one sheet is a ruled surface that can support the notion of pencil of rays of light and is compatible with the notion of "étendue" of physical light beams.

In an embodiment of the invention, a pixel beam 40, 50 is defined by four independent parameters: $z_p$, $\theta_x$, $\theta_y$, a defining the position and size of the pixel conjugate 45, 55, in front of the pupil 44, 54.

A hyperboloid of one sheet representing a pixel beam may be defined by the following equation:

$$\frac{(x - z \cdot t_x)^2}{a^2} + \frac{(y - z \cdot t_y)^2}{a^2} - \frac{(z - z_p)^2}{c^2} = 1 \quad (1)$$

where $t_x = \tan \theta x$ and $t_y = \tan \theta y$.

An origin O of a coordinate system (x, y, z) in which the parameters of the pixel beam 40, 50 are defined corresponds to the centre of the pupil 44 as shown on FIG. 4, where the z axis defines a direction normal to the surface of the pupil 44, 54.

The parameters $\theta_x$, $\theta_y$, define a chief ray directions relative to the entrance of the pupil 44 centre. They depend on the pixel 42 position on the sensor 43 and on the optical elements of the optical system 41. More precisely, the parameters $\theta_x$, $\theta_y$ represent shear angles defining a direction of the conjugate 45 of the pixel 42 from the centre of the pupil 44.

The parameter $z_p$ represents a distance of the waist 55 of the pixel beam 40, 50, or the conjugate 45 of the pixel 42, along the z axis.

The parameter a represents the radius of the waist 55 of the pixel beam 40, 50, and c is given by the following equation:

$$c^2 = \frac{a^2 z_p^2}{r^2 - a^2} \quad (2)$$

where r is the radius of the pupil 44, 54.

The computation of the values of the parameters $z_p$, a and c is realized for each pixel beam of a given camera during a calibration phase of said camera. This calibration phase consists, for example, in running a program capable of modelling a propagation of rays of light through the optical system of the camera. Such a program is for example an optical design program such as Zemax, ©, ASAP© or Code V©. An optical design program is used to design and analyze optical systems. An optical design program models the propagation of rays of light through the optical system; and can model the effect of optical elements such as simple lenses, aspheric lenses, gradient index lenses, mirrors, and diffractive optical elements, etc.

Thus, a pixel beam 40, 50 may be defined by its chief ray and the parameters $z_p$, a and c.

However, such a representation of a pixel beam 40, 50 takes up large amounts of storage space since the classical file format for storing rays consists in storing a position and a direction in a 3D space.

Figure 6A:
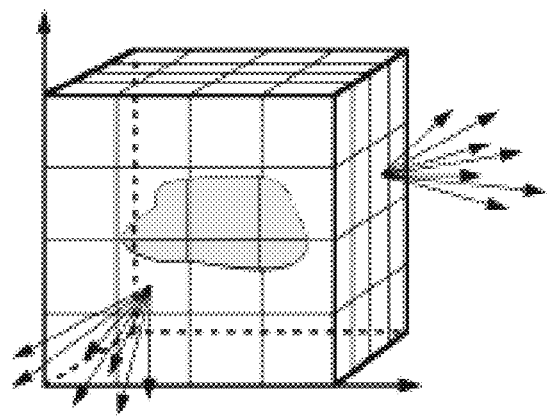
FIGS. 6A and 6B graphically illustrate the use of reference planes for parameterisation of light-field data in accordance with one or more embodiments of the invention.

In order to propose a file format for storing rays which needs less storage space, a method for parametrizing the four dimensions of light-field radiance may be with reference to the cube illustrated in FIG. 6A. All six faces of the cube may be used to parameterize the light-field. In order to parameterize direction, a second set of planes parallel to the cube faces, may be added. In this way the light-field may be defined with respect to six pairs of planes with normals along the axis directions as:

$$\vec{i}, -\vec{i}, \vec{j}, -\vec{j}, \vec{k}, -\vec{k}$$

Figure 6B:
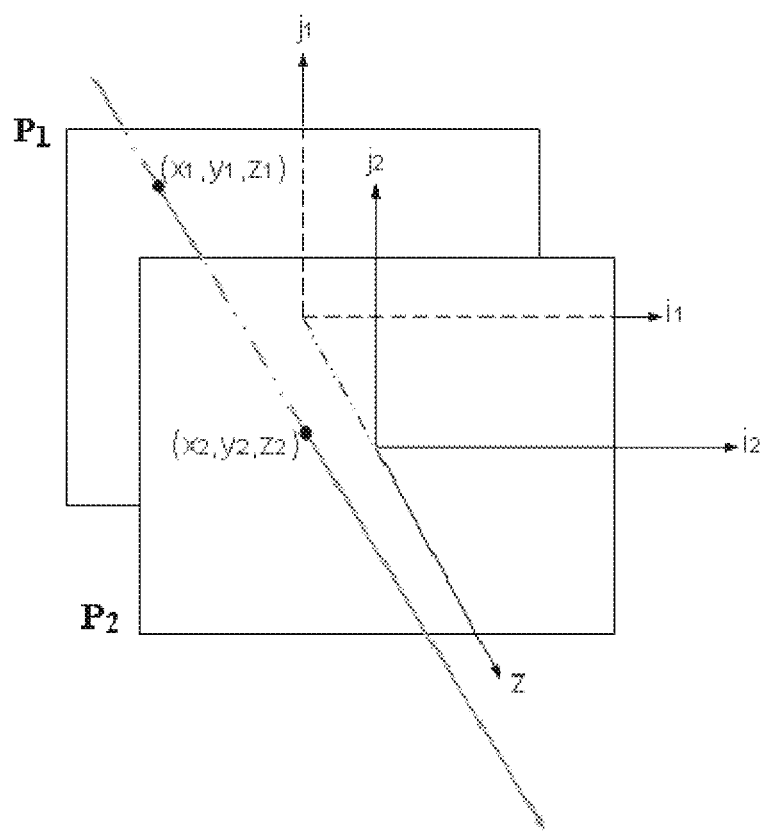

FIG. 6B illustrates a light-field ray passing through two reference planes P1 and P2 used for parameterization positioned parallel to one another and located at known depths $z_1$ and $z_2$ respectively. The light-field ray intersects the first reference plane $P_1$ at depth $z_1$ at intersection point $(x_1, y_1)$ and intersects the second reference plane $P_2$ at depth $z_2$ at intersection point $(x_2, y_2)$. In this way the light-field ray may be identified by four coordinates $(x_1, y_1, x_2, y_2)$. The light-field can thus be parameterized by a pair of reference planes for parameterization $P_1$, $P_2$ also referred herein as parametrization planes, with each light-field ray being represented as a point $(x_1, y_1, x_2, y_2) \in R^4$ in 4D ray space.

For example an origin of the reference co-ordinate system may be placed at the center of a plane $P_1$ generated by the basis vectors of the coordinate axis system ($\vec{i}_1, \vec{j}_1$). The $\vec{k}$ axis is normal to the generated plane $P_1$ and the second plane $P_2$ can be placed for the sake of simplicity at a distance z=Δ, from plane $P_1$ along the $\vec{k}$ axis. In order to take into account the six different directions of propagation the entire light-field may be characterized by six pairs of such planes. A pair of planes, often referred to as a light slab characterizes the light-field interacting with the sensor or sensor array of the light-field camera along a direction of propagation.

The position of a reference plane for parameterization can be given as:

$\vec{x_0} = d\vec{n}$ where $\vec{n}$ is the normal and d is an offset from the origin of the 3D coordinate system along the direction of the normal.

A Cartesian equation of a reference plane for parameterization can be given as:

$$\vec{n}(\vec{x} - \vec{x_0}) = 0$$

If a light-field ray has a known position:

$\vec{x_i}(x_i, y_i, z_i)$ and a normalised propagation vector:

$\vec{u}(u_1, u_2; u_3)$ the general parametric equation of a ray in 3D may be given as:

$$\vec{x} = t\vec{u} + \vec{x_i}$$

The co-ordinates of the intersection $\vec{x1}$ between the light-field ray and a reference plane are given as:

$$\vec{x_1} = \vec{x_i} + \vec{u}\frac{\vec{n}(\vec{x_0} - \vec{x_i})}{\vec{u}\vec{n}} \quad (A)$$

There is no intersection between the light-field rays and the reference parameterization if the following condition is not satisfied:

$$(\vec{x_1} - \vec{x_0})\vec{u} > 0$$

Due to the perpendicularity with one of the axes of the system of the pair of reference planes used to parameterize the light-field, one of the components of the ray intersection is always constant for each plane. Hence if there is an intersection of a light-field ray $\vec{x1}$ with the first reference plane, and the intersection $\vec{x2}$ of the said light-field with the second reference plane, four coordinates vary and equation A can be used to calculate the four parameters of a light-field ray. These four parameters can be used to build up a 4D ray diagram of the light-field.

Figure 7:
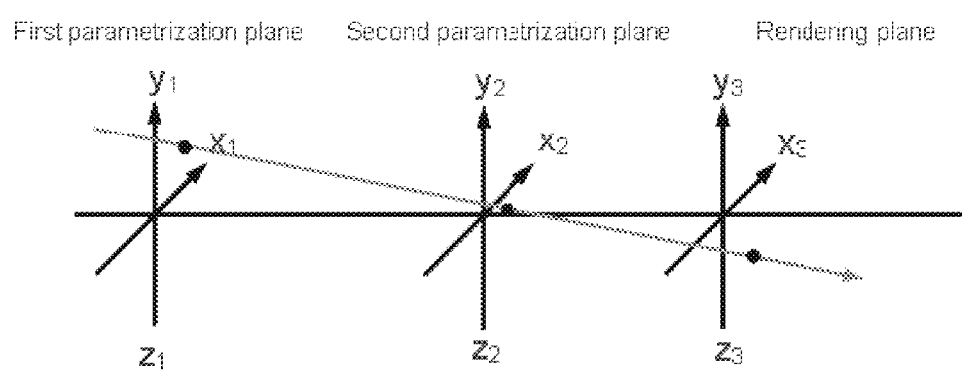
FIG. 7 schematically illustrates representation of light-field rays with respect to reference planes in accordance with embodiments of the invention.

Assuming parameterization of the light-field with reference to two parameterization reference planes, data representing the light-field may be obtained as follows. If a reference system is set as pictured in FIG. 7 a first parametrization plane P1 is perpendicular to z axis at z=z1, a second parametrization plane P2 is arranged perpendicular to the z axis at z=z2 and a ray whose light-field parameters are L(x1; y1; x2; y2) are to be rendered at a location z=z3 where a photosensor array of a light-field camera is positioned. From equation (A):

$$\vec{x_3} = \vec{x_2} + \vec{u}\frac{\vec{n}(z_3\vec{n} - \vec{x_2})}{\vec{u}\vec{n}}$$

$$\vec{x_3} = \vec{x_1} + \vec{u}\frac{\vec{n}(z_3\vec{n} - \vec{x_2})}{\vec{u}\vec{n}} \text{ with}$$

$$\vec{u} = \frac{\vec{x_2} - \vec{x_1}}{\|\vec{x_2} - \vec{x_1}\|} = (u_x, u_y, u_z)$$

$$\vec{n}(0, 0, 1)$$

Developing the above expression gives:

$$x_3 = x_2 + \frac{u_x}{u_z}(z_3 - z_2)$$

$$y_3 = y_2 + \frac{u_y}{u_z}(z_3 - z_2)$$

$$z_3 = z_3$$

$$x_3 = x_1 + \frac{u_x}{u_z}(z_3 - z_1)$$

$$y_3 = y_1 + \frac{u_y}{u_z}(z_3 - z_1)$$

$$z_3 = z_3$$

Both sets of equation should deliver the same point $\vec{x3}$ as the rendered light-field ray at the new location. By replacing $u_x$; $u_y$; $u_z$ with their corresponding expression as functions of $\vec{x1}$ and $\vec{x2}$, if the second set of equation from the previous block is used and x3 and y3 are added together:

$$x_1 + \frac{z_3 - z_1}{z_2 - z_1}(x_2 - x_1) + y_1 + \frac{z_3 - z_1}{z_2 - z_1}(y_2 - y_1) = x_3 + y_3$$

Leading to the expression:

$$(z_2-z_3)(x_1+y_1)+(z_3-z_1)(x_2+y_2)=(z_2-z_1)(x_3+y_3) \quad (B)$$

Co-ordinates with a subscript $_3$ relate to a known point $(x_3, y_3, z_3)$ where the light-field is rendered. All depth co-ordinates $z_i$ are known. The parameterisation planes are in the direction of propagation or rendering. The light-field data parameters L are $(x_1, y_1, x_2, y_2)$ The light-field rays that form an image at point $(x_3, y_3, z_3)$ are linked by expression (B) which defines a hyper plane in $\mathbb{R}^4$.

Figure 8A:
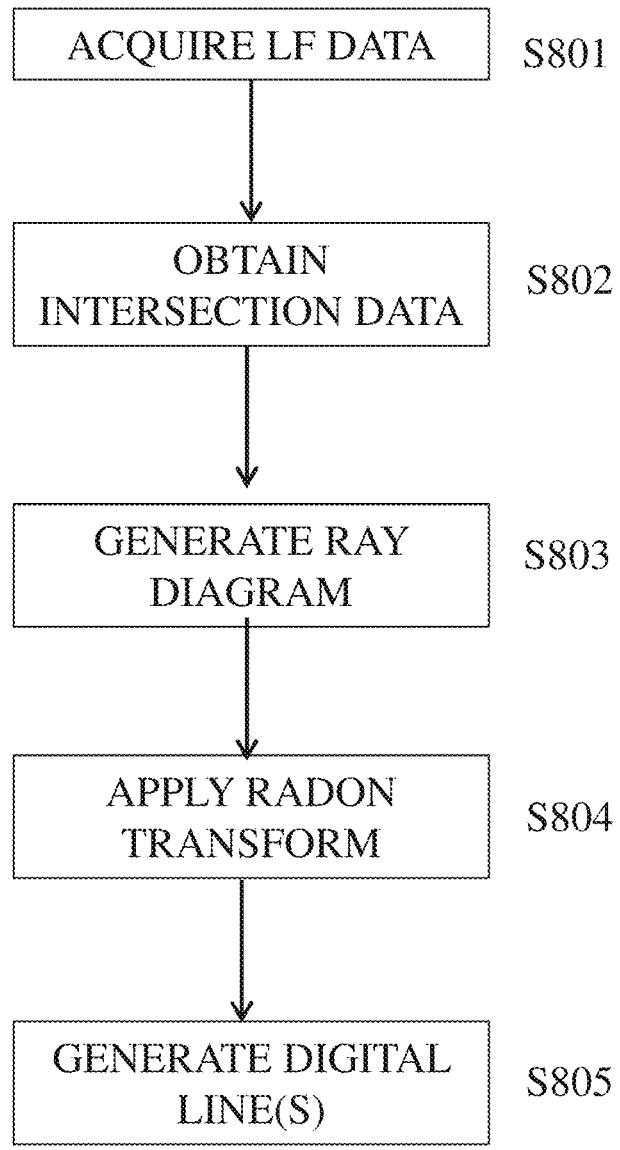
FIG. 8A is a flow chart illustrating steps of a method in accordance with one or more embodiments of the invention.
Figure 8B:
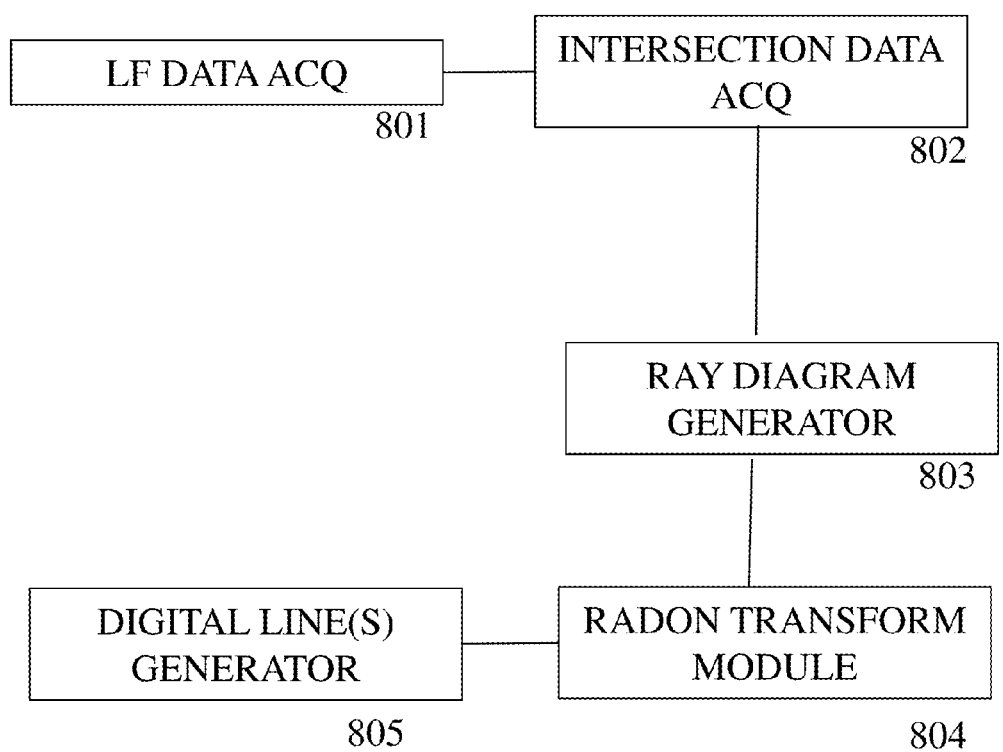
FIG. 8B is a functional block diagram illustrating modules of a device for providing a light data format in accordance with one or more embodiments of the invention.

This signifies that if images are to be rendered from a two-plane parametrized light-field, only the rays in the vicinity of hyperplanes need to be rendered, there is no need to trace them. FIG. 8A is a flow chart illustrating the steps of a method for generating data representative of a light-field according to one or more embodiments of the invention. FIG. 8B is a block diagram schematically illustrating the main modules of a system for generating data representative of a light-field according to one or more embodiments of the invention.

In a preliminary step S801 of the method parameters defining the different pixel beams associated to the pixels of the sensor of the camera are acquired either by calibrating the camera of by retrieving such parameters from a data file stored in a remote server or on a local storage unit such as the memory 290 of the camera or a flash disk connected to the camera.

Such parameters are the coordinates of the chief rays of the different pixel beams and the parameters $z_p$ and a defining the position and size of the pixel conjugate in front of the pupil obtained for each pixel beam during the calibration of the camera. A chief ray of a pixel beam is a straight line passing through the centre of the pixel and the centre of the pupil supporting the pixel beam. In another preliminary step S802 raw light-field data is acquired by a light-field camera 801. The raw light-field data may for example be in the form of micro images as described with reference to FIG. 3. The light-field camera may be a light-field camera device such as shown in FIGS. 1A or 1B and 2A and 2B.

In step S803 the acquired light-field data is processed by ray parameter module 802 to provide intersection data $(x_1, y_1, x_2, y_2)$ defining intersection of captured light-field rays, which correspond to chief rays of pixel beams 40, 50, with a pair of reference planes for parameterization $P_1$, $P_2$ at respective depths $z_1$, $z_2$.

Figure 9:
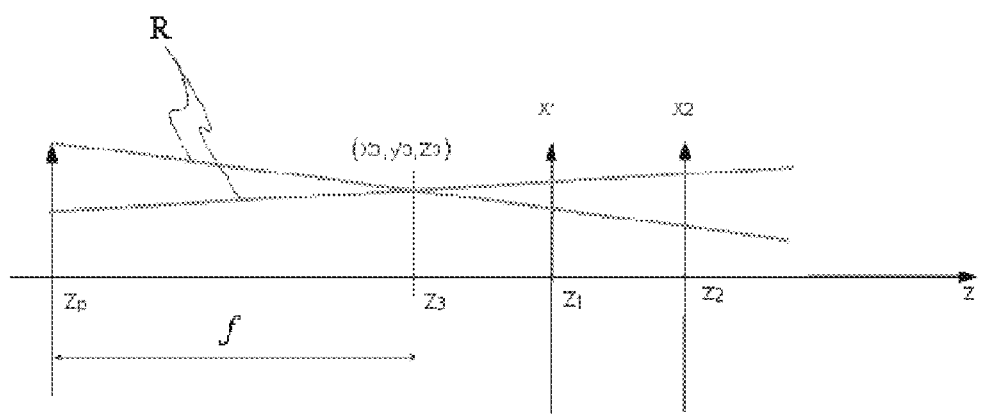
FIG. 9 schematically illustrates parameters for representation of light-field rays in accordance with embodiments of the invention.

From calibration of the camera the following parameters can be determined: the centre of projection $(x_3, y_3, z_3)$ the orientation of the optical axis of the camera and the distance f from the pinhole of the camera to the plane of the photosensor. The light-field camera parameters are illustrated in FIG. 9. The photosensor plane is located at depth $z_p$ The pixel output of the photosensor is converted into geometrical representation of light-field rays. A light-slab comprising the two reference planes $P_1$ and $P_2$ is located at depths $z_1$ and $z_2$, respectively, beyond $z_3$, at the other side of the centre of projection of the camera to the photosensor. By applying a triangle principle to the light rays, pixel coordinates $(x_p, y_p, z_p)$ recording the light projected from the array of microlenses can be mapped to ray parameters i.e. reference plane intersection points $(x_1, y_1, x_2, y_2)$ by applying the following expression:

$$x_1 = \frac{z_3 - z_1}{z_3 - z_p}x_p + \frac{z_1 - z_p}{z_3 - z_p}x_3$$

$$y_1 = \frac{z_3 - z_1}{z_3 - z_p}y_p + \frac{z_1 - z_p}{z_3 - z_p}y_3$$

$$x_2 = \frac{z_3 - z_2}{z_3 - z_p}x_p + \frac{z_1 - z_p}{z_3 - z_p}x_3$$

$$y_2 = \frac{z_3 - z_2}{z_3 - z_p}y_p + \frac{z_1 - z_p}{z_3 - z_p}y_3$$

The above calculation may be extended to multiple cameras with different pairs of triplets $(x_p, y_p, z_p)$ $(x_3, y_3, z_3)$:

In the case of a plenoptic camera, a camera model with an aperture is used and a light-field ray is described in the phase space as having an origin $(x_p, y_p, z_p)$ and a direction $(x'_3, y'_3, 1)$. Its propagation unto the plane $(x_3, y_3)$ at depth $z_3$ can be described as a matrix transform. The lens will act as an ABCD matrix to refract the ray and another ABCD propagation matrix will bring the ray onto the light-slab reference planes $P_1$ and $P_2$.

From this step intersection data $(x_1, y_1, x_2, y_2)$ geometrically defining intersection of light-field rays with reference planes $P_1$, $P_2$ is obtained.

In step S804 2D ray a diagram graphically representing the intersection data $(x_1, y_1, x_2, y_2)$ is obtained by ray diagram generator module 803.

Figure 10:
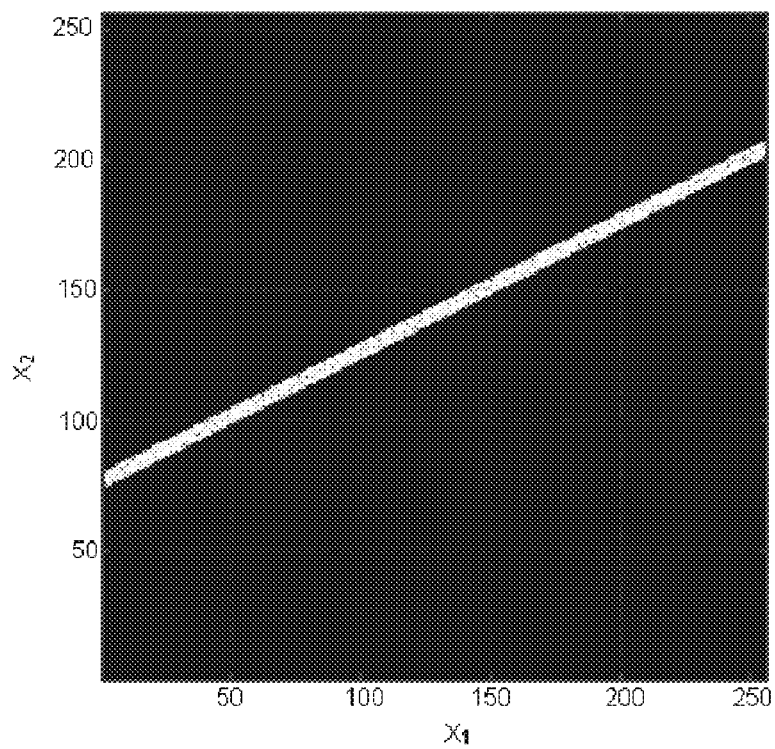
FIG. 10 is a 2D ray diagram graphically illustrating intersection data in accordance with embodiments of the invention.

FIG. 10 is a 2D ray diagram graphically representing intersection data $(x_1, x_2)$ of light-field rays captured by a camera at location $x_3=2$ and depth $z_3=2$ with an aperture $|A|<0.5$. The data lines of the ray diagram used to parameterise are sampled by 256 cells providing an image of 256×256 pixels.

If the ray diagram illustrated in FIG. 10 is interpreted as a matrix, it can be seen that it is sparsely populated. If the rays were to be saved individually in a file instead of the 4D phase space matrix, this would require saving for each ray, at least 2 bytes (int16) for each position $x_i$ or $x_3$ plus 3 bytes for the color, i.e. 7 bytes per ray for a 2D slice light-field, and 11 bytes per ray for its full 4D representation. Even then, the rays would be stored randomly in the file which might be unsuitable for applications that need to manipulate the representation. The inventors of the present invention have determined how to extract only the representative data from the ray diagram matrix and to store the data in a file in a structured manner.

Since the 2D sliced light-field rays are mapped along data lines of the 2D ray diagram, it is more efficient to store parameters defining the data line rather than the line values themselves. Parameters defining the data line such as, for example, a slope defining parameter s and an axis intercept d may be stored with the set of light-field rays belonging to that data line.

This could require for example as little as 2 bytes for slope parameter s, 2 bytes for slope parameter d and then only 3 bytes per ray, Moreover, the rays may be ordered along lines in the file. In order to set lines through matrix cells so called digital lines are generated which approximate the ray lines with minimum error.

To locate the data lines and to obtain slope parameter s and intercept parameter d step S805 a Radon transform is performed by line detection module 804 on the ray diagram generated in step S804.

From the obtained slope parameter s and intercept parameter d a representative digital line is generated by digital line generation module 805 in step S806. In this step digital lines are generated by approximating an analytical line to its nearest grid point, for example by applying Bresenham's algorithm. Indeed Bresenham's algorithm provides a way to provide a digital line with minimal operation. An example of Bresenham application is one adapted from the following reference: http://www.cs.helsinki.fi/group/goa/mallinnus/lines/bresenh.html.

The digital format defines the data line by two points of a grid (0,d) and (N-1, s) d being the interception corresponding to the value of $x_2$ when $x_1=0$ and s being the slope parameter corresponding to the value of $x_2$ when $x_1=N-1$. From the digital format generated the slope a of each individual line may be expressed as a function of, and s, as:

$$a = \frac{s-d}{N-1}$$

where:

$s \in \{0, 1, \ldots N-1\}$ and $d \in \{0, 1, \ldots N-1\}$

Figure 11:
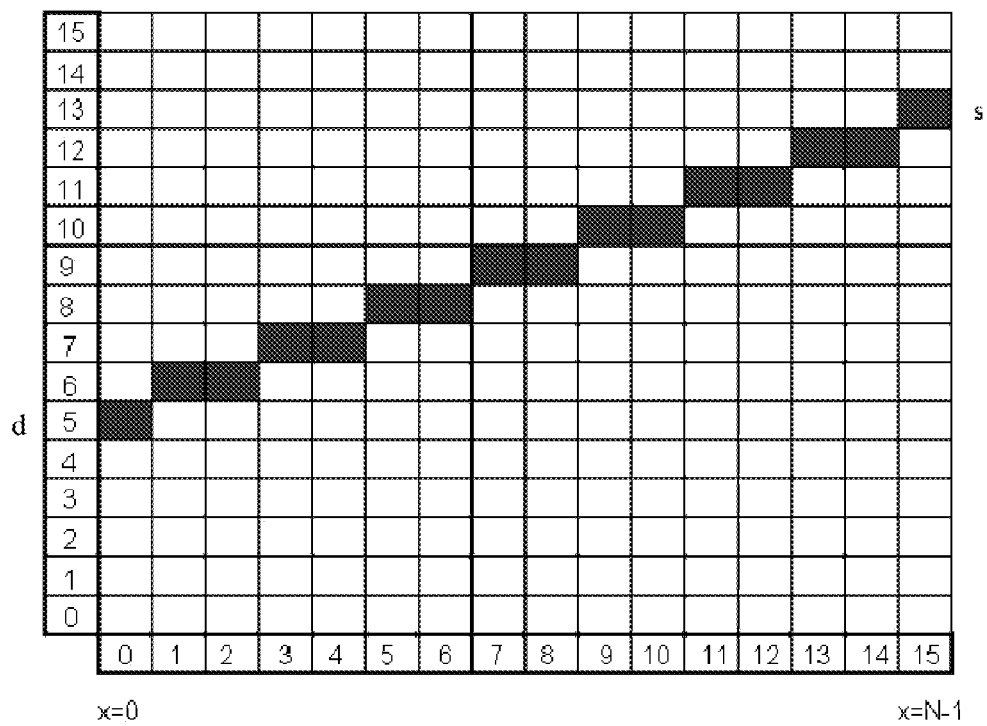
FIG. 11 graphically illustrates a digital line generated in accordance with embodiments of the invention.

FIG. 11 illustrates an example of a digital line generated by application of Bresenham's algorithm.

Figure 12:
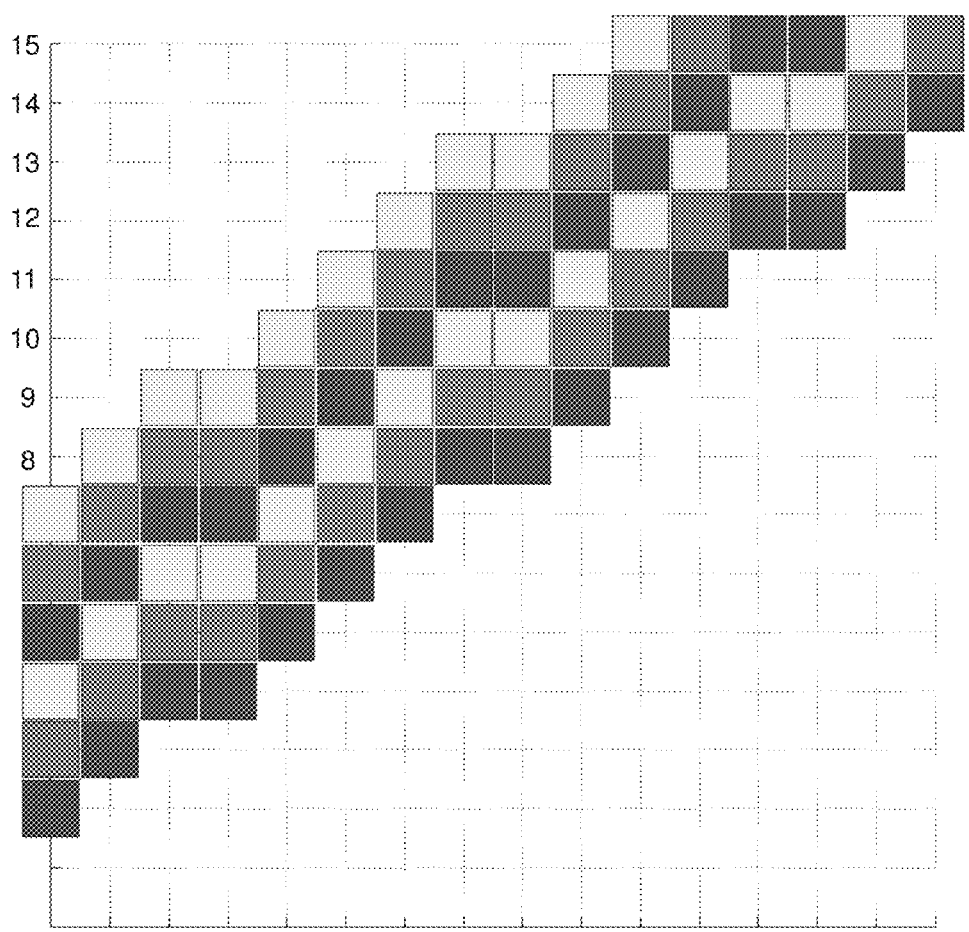
FIG. 12 graphically illustrates digitals line generated in accordance with embodiments of the invention.

FIG. 12 illustrates a group of digital lines having the same slope a (or s-d) but different intercepts d, the group of data lines being contiguous. The group of data lines is referred to herein as a bundle of lines and corresponds to a beam resulting from the camera not being ideally pinpoint. Each line addresses different pixels. In other words, one pixel belongs only to a unique line of a bundle with the same slope but different intercepts. The upper and lower boundaries of the axis interceptions d are given as $d_{max}$ and $d_{min}$ respectively.

Ray data parameterized by a sampled pair of lines (in 2D) and belonging to one camera, belong to a family of digital lines (beam) in the phase space used for representing the data. The header of the beam can simply contain the slope a and the thickness of the beam defined by the upper and lower boundaries of the axis interceptions $d_{max}-d_{min}$. The ray values will be stored as RGB colors along digital lines whose header can be d and s. Void cells of the ray diagram in the sampled space do not need to be stored. Coordinates x1; x2 of the rays can be deduced from the parameters d, s and from the position of the cell along the digital line.

Parameters to be estimated from the lightfield or from camera's geometry are the slope a the lower and upper bounds of the digital line intercepts ($d_{min}$, $d_{max}$), and the digital line parameters ($d_i$, $s_i$). The discrete Radon transform has already been discussed as a tool to measure the support location of the light-field in the ray diagram.

Figure 13A:
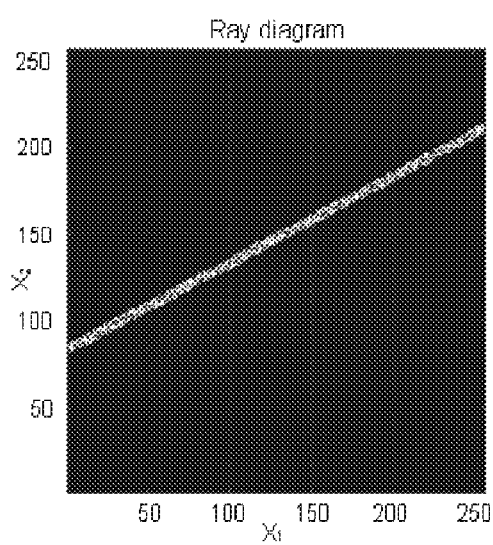
FIGS. 13A, 13B and 13C graphically illustrate Radon transforms applied to a digital line in accordance with embodiments of the invention.
Figure 13B:
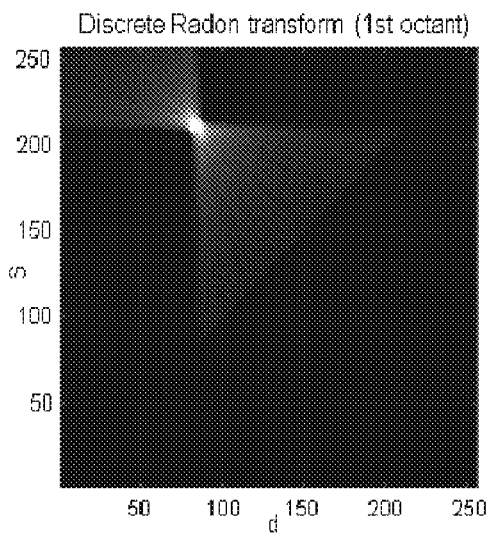
Figure 13C:
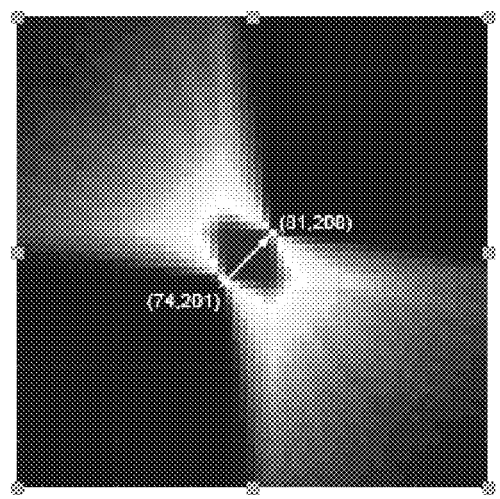
Figure 14:
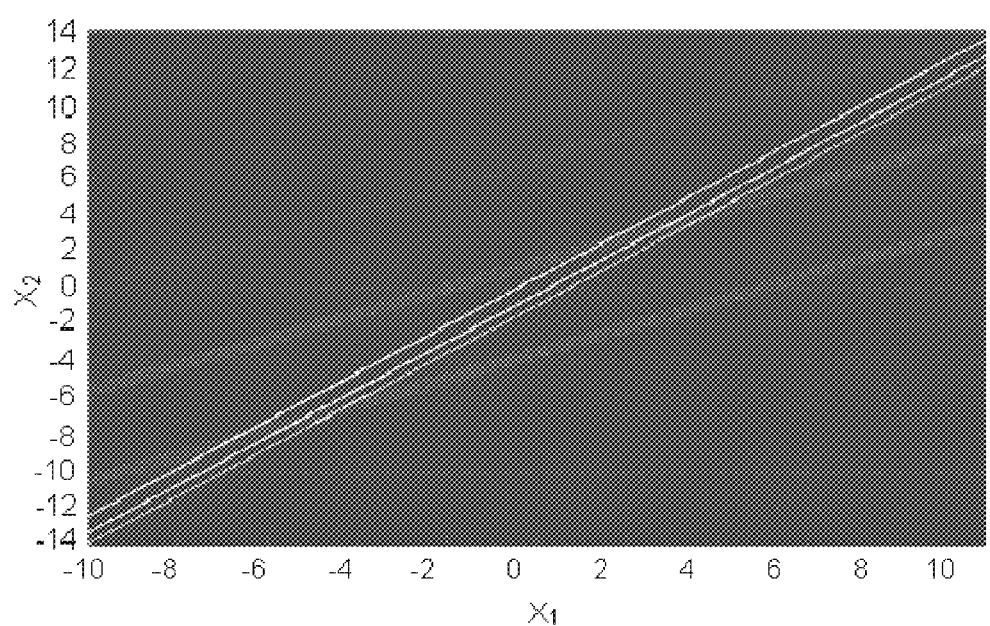
FIG. 14 is a 2D ray diagram graphically illustrating intersection data for a plurality of cameras in accordance with embodiments of the invention.

FIG. 13B shows the discrete Radon transform in the digital line parameter space (d, s) of the datalines of FIG. 13A. FIG. 13C is a zoom of the region of interest comprised in FIG. 12B. The beam of digital lines is located by the search for the maximum value parameters. There could be some offset between the geometrical center of symmetry of the DRT and the actual position of the maximum due to image content so that later on, an algorithm is used to pin-point the center of symmetry instead of the maximum.

Then, the waist of the beam transform as shown on FIG. 13C is easy to find to give the values ($d_{min}$, $d_{max}$). Point ($d_{min}=74$, s=201) is the lower envelope of the beam of digital lines from FIG. 12A, and point ($d_{max}=81$, s=208) is the upper envelope of the beam of digital lines.

The equations of two orthogonal 2D sliced spaces from equation B is given as.

$$(z_2-z_3)(x_1+y_1)+(z_3-z_1)(x_2+y_2)=(z_2-z_1)(x_3+y_3) \quad (C)$$

If a 2D slice for $x_i$ coordinates is taken, the equation of the beam of lines where ray data through an aperture of size A at ($x_3, y_3, z_3$) will map is given as:

$$x_2 = \frac{(z_3-z_2)}{(z_3-z_1)}x_1 + \frac{(z_2-z_1)}{(z_3-z_1)}(x_3 \pm A) = mx_1 + (d_{max_x} - d_{min_x}) \quad (D)$$

Similarly, if a 2D slice is taken for $y_1$ coordinates:

$$y_2 = \frac{(z_3-z_2)}{(z_3-z_1)}y_1 + \frac{(z_2-z_1)}{(z_3-z_1)}(y_3 \pm A) = my_1 + (d_{max_y} - d_{min_y}) \quad (E)$$

As previously described, the values of m and $d_{max_x}$, $d_{min_x}$, $d_{max_y}$, $d_{min_y}$ may be evaluated in the discrete domain to localize the characteristics of a light-field as defined by the format discussed previously, there is no need to perform a 4D discrete Radon transform. If two orthogonal 2D DRT are obtained, measurements can be performed of the slope m of the hyper-plane and the beam width of the digital hyper-planes where all data concentrates in the 4D ray-diagram.

This simpler procedure of location assumes a circular entrance pupil A so that $d_{max_x}$, $d_{min_x}$, $d_{max_y}$, $d_{min_y}$ will encompass all hyper-planes intercepts, some values written in the format will contain no values.

It would be interesting to obtain a format for the 4D case which is similar to what was proposed for the 2D case. To do so, it would be interesting to associate the 2D lines found on the $\Pi(x_1, x_2)$, plane with the lines found on the $\Pi(y_1, y_2)$ place, i.e., the lines that are the results of the intersection of the corresponding hyper plane with the two orthogonal slices of $\Pi(x_1, x_2)$, and $\Pi(y_1, y_2)$, From expressions D and E, it is known that the corresponding lines have the same slope m. This is the first parameter that associates each line in $\Pi(x_1, x_2)$ to a line in $\Pi(y_1, y_2)$, for a camera at a certain depth. If there are multiple cameras at the same depth (i.e., the case of FIG. 13A), there are three lines in $\Pi(x_1, x_2)$, and three lines in $\Pi(y_1, y_2)$, with the same estimated slope of m. The correspondences in the line offsets between the lines in these two planes are then determined. To do this, the formulation of the lines in expressions D and E are exploited. In particular, denoting $$k = \frac{z_2-z_1}{z_3-z_1},$$

the offsets are as follows:

$$\begin{cases} kx_3 + kA = d_{max_x} \\ kx_3 - kA = d_{min_x} \end{cases} \text{ and } \quad (F)$$

-continued $$\begin{cases} ky_3 + kA = d_{max_y} \\ ky_3 - kA = d_{min_y} \end{cases} \quad (G)$$

The sets of the equations may be solved for k, $x_3$ and $y_3$. Note that ($x_3$, $y_3$, $z_3$) correspond to the coordinates of the camera, or in other words the voxel where the corresponding bundle of light is focused into a circle of the radius A. We have supposed that the aperture on the plane positioned at $z_3$ is circular, so that $d_{max_x} - d_{min_x} = d_{max_y} - d_{min_y} = 2kA$, and by solving the previous sets of equations:

$$k = \frac{d_{max_x} - d_{min_x}}{2A} \quad (G)$$

$$x_3 = A \frac{d_{max_x} + d_{min_x}}{d_{max_x} - d_{min_x}} \quad (H)$$

$$y_3 = A \frac{d_{max_y} + d_{min_y}}{d_{max_y} - d_{min_y}} \quad (I)$$

$$z_3 = \frac{z_2 + (k-1)z_1}{k} \quad (J)$$

The digital lines may be scanned as before on $\Pi(x_1, x_2)$ using the Bresenham digital lines; For each individual ($x_1$, $x_2$), value, the corresponding ($y_1$, $y_2$) values captured in the light-field are stored. To find such values, expression C is exploited. All the following are either known or estimated from expressions F and G x3; y3; z3; z1; z2

Moving on each line in $\Pi(x_1, x_2)$, for each ($x_1^q$, $x_2^q$), the following relationship in ($y_1$, $y_2$) is obtained:

$$y_2 = \frac{z_3 - z_2}{z_3 - z_1} y_1 + \frac{z_3 - z_2}{z_3 - z_1} x_1^q + \frac{z_2 - z_1}{z_3 - z_1}(x_3 + y_3) - x_2^q \text{ or,}$$

$$y_2 = my_1 + mx_1^q + k(x_3 + y_3^*) - x_2^q = my_1 + d_{off}(x_1^q, x_2^q, x_3 y_3^*)$$

For each point in $\Pi(x_1, x_2)$, a collection of lines in $\Pi(y_1, y_2)$ is saved. $d_{off}$ corresponds to the offset of the lines scanned and saved for ($x_1^q$, $x_2^q$). It is noted that:

$$d_{off}(x_1^q, x_2^q) = mx_1^q + k(x_3 + y_3^*) - x_2^q$$

With reference to FIG. 12 each square is a ($x_1^q$, $x_2^q$), point, and for each one of these points, there is a set of Bresenham digital lines running out of the plane of the figure along a digital bundle defined by equation:

$$y_2 = my_1 + d_{off}(x_1^q, x_2^q, x_3, y_3^*) \quad (K)$$

perpendicular to the depicted datalines, but in a 4D space.
An exemplary data format for a bundle of data lines per camera is illustrated in Table 1.

TABLE 1

| Tags | | | Data | | | |
|---|---|---|---|---|---|---|
| Light slab orientation 1 | | | one tag w from (−x, +x, −y, +y, −z, +z) | | | |
| Parametrization plane offset $w_2$-$w_1$ ($w_3$ is relative to $w_1$) (float) | | | □e | | | |
| Width in number of $u_1$ cells (integer) | min $u_1$ value (float) | max $u_1$ value (float) | N | $u_{1min}$ | $u_{1Max}$ | |
| Width in number of $u_2$ cells (integer) | min $u_2$ value (float) | max $u_2$ value (float) | M | $u_{2min}$ | $u_{2Max}$ | |
| Width in number of $v_1$ cells (integer) | min $v_1$ value (float) | max $v_1$ value (float) | P | $v_{1min}$ | $v_{1Max}$ | |
| Width in number of $v_2$ cells (integer) | min $v_2$ value (float) | max $v_2$ value (float) | Q | $v_{2min}$ | $v_{2Max}$ | |
| Number of cameras (integer) | | | n | | | |
| Aperture size for $cam_1$ | | | $A_1$ | | | |
| $Cam_1$ focus (3 floats) | | | $u3_1$ | $v3_1$ | $w3_1$ | |
| lowest $cam_1$ intercept in ($u_1$, $u_2$) | $cam_1$ steepness | $cam_1$ number of digital lines in $u_1$, $u_2$ | $d_1$ | $m_1$ | $1^x_1$ | |
| | | $cam_1$ number of digital lines in $v_1$, $v_2$ | | | $1^y_1$ | |
| data line ($end_1 = 1^x_1 * N * 1^y_1 * P$) * (3 bytes + 2 floats) | | | (RGB $z_p$ a)$_0$ | (RGB $z_p$ a)$_1$ | ... | (RGB $z_p$ a)$_n$ |
| ... | | | ... | ... | | |
| ... | | | ... | ... | ... | ... |
| Aperture size for $cam_n$ | | | $A_n$ | | | |
| $Cam_n$ focus (3 floats) | | | $u3_n$ | $v3_n$ | $w3_n$ | |
| lowest $cam_n$ intercept in ($u_1$, $u_2$) | $cam_n$ steepness | $cam_n$ number of digital lines in $u_1$, $u_2$ | $d_n$ | $m_n$ | $1^x_n$ | |

TABLE 1-continued

| Tags | Data | | | | |
|---|---|---|---|---|---|
| | $cam_n$ number of digital lines in $v_1, v_2$ | $1^y{}_n$ | | | |
| data line $(end_n = 1^x{}_n *N*1^y{}_n *P) *$ (3 bytes + 3floats) | (RGB $z_p$ a)$_0$ | (RGB $z_p$ a)$_1$ | ... | (RGB $z_p$ a)$_n$ | |

Firstly general metadata of the 4D space is provided: including boundaries of the 4 axes $x_1, x_2, y_1, y_2$ and their corresponding sampling. The number of cameras (bundles) is also provided. For each camera j the following parameters are saved:

the size of the aperture: $A_j$, which corresponds to the diameter of the pupil of a pixel beam, the focus point of the camera: $cam_j$; focusPoint=$(u_3, u_3, w_3)$ lowest d intercept in $(x1_x, 2)=d_j$ steepness=$m_j$ number of digital lines in $(x_1, x_2)=l_j^x$ number of digital lines in $(y_1, y_2)=l_j^{xy}$ On each camera, for each $(x^q{}_1; x^q{}_2)$, scanning is started on $(y_1, y_2)$ with respect to expression (K) using the Bresenham digital lines, and the RGB values of each light-filed rays are saved. In particular $y_3*-A$ to $y_3*+A$ and the corresponding $d_{off}$ is calculated according to expression (K).

Since the light-field rays correspond to the chief rays of the pixel beams, the values of the parameters $z_p$, a of a given pixel beam are stored alongside the RGB values of the corresponding light-field ray as shown in table 1.

The same calculations are performed in the decoding step using the stored metadata. In particular, k is found using equation (G). Hence the format remains compact. There is no need to store four indexes for each ray in the system. It is noted that the sampling of the hyper-plane above is the sampling of the 4D ray-space and thus a single x1; y1; x2; y2 location is not missed. This is only one example of a systematic scanning of the 4D ray-space for saving all data in a very compact form. Other processes may of course be applied. The parametric form seems to be adapted to explore the hyper-plane because it permits an inter-leaved space exploration.

In the case of multiple cameras to work on data that contains several bundles of hyper-planes (several maxima in the Radon transform due to multiple cameras), a more complex algorithm may be used. As a pre-processing step, the parameters (m, k) are found for all the peaks in the radon transform of $\Pi(x_1, x_2)$, and put in one set. The same is done for the peaks in $(y_1, y_2)$ and the parameters are put in another set. Now in each iteration of the greedy algorithm, the maximum peak intensity is found in the 2D radon transform of $(x_1, x_2)$ and the corresponding peak in $(y_1, y_2)$ is found by matching the previously found parameters (m, k). After saving the data as mentioned in the last section, these peaks are cleaned from the radon transforms, and the next iteration is started, until nothing meaningful remains in the light-field Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method for generating data representative of a volume in an object space of an optical acquisition system occupied by a set of rays of light that at least one pixel of a sensor of said optical acquisition system can sense through a pupil of said optical acquisition system, said volume being called a pixel beam, comprising:
   obtaining, from light field data captured by the optical acquisition device, intersection data defining intersections of a light field ray representative of the pixel beam with a plurality of given reference planes, said reference planes corresponding to different depths in the object space;
   obtaining ray diagram parameters defining the graphical representation of the intersection data in a 4D ray diagram; and
   associating said ray diagram parameters with parameters defining the pixel beam to provide data representative of the pixel beam.

2. A method according to claim 1 wherein the light field ray representative of the pixel beam is a straight line passing through the centre of the pixel and the centre of the pupil and the parameters defining the pixel beam are a position and a size of a conjugate of the pixel in the object space.

3. A method according to claim 2 wherein the interception data corresponding to the light field ray is graphically represented in the ray diagram as datalines and the ray diagram parameters include data representative of at least one of:
   the slope of a dataline; and
   an interception of a dataline with an axis of the ray diagram.

4. A method according to claim 3 wherein the datalines are detected in the 2D ray diagram by applying a Radon transform.

5. A method according to claim 3 wherein the graphical representation is provided as an matrix of cells to provide a digital datalinet, each digital dataline format being defined by a plurality of cells, at least one first cell representative of the interception of the line with an axis and at least one second cell from which the slope of the line may be determined.

6. A method according to claim 5 wherein each digital dataline is generated by application of Bresenham's algorithm.

7. A method according to any preceding claim wherein the data representative of the pixel beam further comprises color data representing the color of the corresponding light field ray.

8. A method according to claim 7 wherein the data representative of the pixel beam is provided as meta data, the header of meta data comprising the ray diagram parameters defining the graphical representation of the intersection data in a 2D ray diagram and the body of the metadata comprising data representative of color of the ray and the parameters defining a position and a size of a conjugate of the pixel in the object space.

9. A device for providing metadata for a volume in an object space of an optical acquisition system occupied by a set of rays of light that at least one pixel of a sensor of said optical acquisition system can sense through a pupil of said optical acquisition system, said volume being called a pixel beam, the device comprising a light field data acquisition module for acquiring light field data captured by a light field camera and a light field data generation module configured to:
- obtain, from the acquired light field data, intersection data defining intersections of the light field ray representative of the pixel beam with a plurality of given reference planes, said reference planes being parallel to one another and corresponding to different depths in the object space; and
- obtain ray diagram parameters defining the graphical representation of the intersection data in a 2D ray diagram to provide data representative of the acquired light field data;
- associate said ray diagram parameters with parameters defining the pixel beam to provide data representative of the pixel beam.

10. A light field imaging device comprising:
- an array of micro lenses arranged in a regular lattice structure;
- a photosensor configured to capture light projected on the photosensor from the array of micro lenses, the photosensor comprising sets of pixels, each set of pixels being optically associated with a respective micro lens of the array of micro lenses; and
- a device for providing metadata in accordance with claim 9.

11. A device for rendering an image from light field data using obtained in accordance with the method of claim 1.

12. A data package for data representative of a volume in an object space of an optical acquisition system occupied by a set of rays of light that at least one pixel of a sensor of said optical acquisition system can sense through a pupil of said optical acquisition system, said volume being called a pixel beam, comprising a ray diagram parameters defining the graphical representation in a 2D ray diagram of intersection data of the light ray representative of the pixel beam, the intersection data defining intersections of the light field ray representative of the pixel beam with a plurality of given reference planes, said reference planes being parallel to one another and corresponding to different depths in the object space; colour data defining colours of the light field ray representative of the pixel beam and parameters defining a position and a size of a conjugate of the pixel in the object space.

13. A computer program product for a programmable apparatus, the computer program product comprising a sequence of instructions for implementing a method according to claim 1 when loaded into and executed by the programmable apparatus.

* * * * *

UNITED STATES PATENT AND TRADEMARK OFFICE
CERTIFICATE OF CORRECTION

PATENT NO. : 10,021,340 B2
APPLICATION NO. : 15/268480
DATED : July 10, 2018
INVENTOR(S) : Valter Drazic, Laurent Blonde and Arno Schubert It is certified that error appears in the above-identified patent and that said Letters Patent is hereby corrected as shown below:

In the Claims

Column 18 Line 24 Claim 1 insert:
--1. A computer implemented method for generating data representative of a volume in an object space of an optical acquisition system occupied by a set of rays of light that at least one pixel of a sensor of said optical acquisition system can sense through a pupil of said optical acquisition system, said volume being called a pixel beam, comprising:
- obtaining, from light field data captured by the optical acquisition device, intersection data defining intersections of a light field ray representative of the pixel beam with a plurality of given reference planes, said reference planes corresponding to different depths in the object space;-
obtaining ray diagram parameters defining the graphical representation of the intersection data in a 2D ray diagram; and
- associating said ray diagram parameters with parameters defining the pixel beam to provide data representative of the pixel beam.--

Signed and Sealed this
Eleventh Day of October, 2022

Katherine Kelly Vidal
*Director of the United States Patent and Trademark Office*